United States Patent
Toillon et al.

(10) Patent No.: US 11,849,373 B2
(45) Date of Patent: Dec. 19, 2023

(54) WIRELESS COMMUNICATION SYSTEM WITH CENTRAL COMMUNICATION UNIT ARRANGED TO COMMUNICATE WITH SUBSCRIBER COMMUNICATION UNITS

(71) Applicant: SAFRAN ELECTRONICS & DEFENSE, Paris (FR)

(72) Inventors: Patrice Toillon, Moissy-Cramayel (FR); Thiebault Jeandon, Moissy-Cramayel (FR); Cédric Moreau, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 70 days.

(21) Appl. No.: 17/378,078

(22) Filed: Jul. 16, 2021

(65) Prior Publication Data
US 2022/0022009 A1    Jan. 20, 2022

(30) Foreign Application Priority Data
Jul. 16, 2020    (FR) ...................................... 2007476

(51) Int. Cl.
*H04W 4/00*    (2018.01)
*H04W 4/06*    (2009.01)
(Continued)

(52) U.S. Cl.
CPC ............. *H04W 4/06* (2013.01); *H04L 1/1607* (2013.01); *H04W 24/04* (2013.01)

(58) Field of Classification Search
None
See application file for complete search history.

(56) References Cited

U.S. PATENT DOCUMENTS 8,149,825 B2 * 4/2012 Kubler .................. H04W 88/06
370/388
9,608,796 B2 * 3/2017 Merlin .............. H04W 52/0219
(Continued)

FOREIGN PATENT DOCUMENTS

CN      109495976 A  *  3/2019  ............ H04W 40/22
WO   WO-9417606 A1  *  8/1994  ........ H04W 52/0274

OTHER PUBLICATIONS

Yue Fang et al: "On the performance enhancement of wireless LAN—a multi-polling mechanism with hidden terminal solution", Global Telecommunications Conference, 2005. GLOBECOM '05. IEEE St. Loius, MO, USA Nov. 28-Dec. 2, 2005, Piscataway, NJ, USA,IEEE, vol. 1, Nov. 28, 2005 (Nov. 28, 2005), pp. 571-575, XP010879143, ISBN: 978-0-7803-9414-8.
(Continued)

*Primary Examiner* — Gerald A Smarth
(74) *Attorney, Agent, or Firm* — Muncy, Geissler, Olds & Lowe, P.C.

(57) ABSTRACT

A central communication unit (13), comprising:
transmitter means arranged to transmit a single global downlink frame (17) addressed to all of the subscriber communication units, the global downlink frame comprising a plurality of data packets, each addressed to a respective one of the subscriber communication units, the global downlink frame supplying a common reference time so that, after receiving the global downlink frame (17), each subscriber communication unit can start transmitting an uplink frame (18) at the end of a waiting interval starting at the common reference time and having a duration equal to a respective waiting duration that is associated with said subscriber communication unit; and
(Continued)

receiver means arranged to receive in succession the uplink frames (18) transmitted by each of the subscriber communication units.

25 Claims, 9 Drawing Sheets

(51) Int. Cl.
  *H04L 1/1607* (2023.01)
  *H04W 24/04* (2009.01)

(56) References Cited

U.S. PATENT DOCUMENTS

| | | | |
|---|---|---|---|
| 10,477,537 B2* | 11/2019 | Rico Alvarino | ... B65D 21/0201 |
| 2017/0026162 A1* | 1/2017 | Nabetani | ............... H04L 1/1854 |

OTHER PUBLICATIONS

Shou-Chih Lo et al: "An efficient scheduling mechanism for IEEE 802.IIE MAC enhancements", Wireless Communications and Networking Conference, 2004. WCNC. 2004 IE EE Atlanta, GA, USA Mar. 21-25, 2004, Piscataway, NJ, USA,IEEE, vol. 2, Mar. 21, 2004 (Mar. 21, 2004), pp. 777-782, XP010708413, ISBN: 978-0-7803-8344-9.

* cited by examiner

WIRELESS COMMUNICATION SYSTEM WITH CENTRAL COMMUNICATION UNIT ARRANGED TO COMMUNICATE WITH SUBSCRIBER COMMUNICATION UNITS

The invention relates to the field of wireless communication systems, and it relates in particular to wireless communication systems incorporated in aircraft.

BACKGROUND OF THE INVENTION

Proposals are presently being made to replace the electric cables that convey data in modern aircraft with wireless communication. This is generally referred to as "wireless avionics intra-communication" (WAIC).

Several protocols are known that enable half-duplex communication to be performed, however none of those known protocols is entirely satisfactory.

With reference to FIG. 1, there follows a description of the implementation of a known protocol in a wireless communication system 1.

The wireless communication system 1 includes a central piece of equipment 2 incorporating a central communication unit 3, together with N remote pieces of equipment 4 (4_1, 4_2, ..., 4_N), each of which incorporates a respective subscriber communication unit 5. The central communication unit 3 communicates with the N subscriber communication units 5 (5_1, 5_2, ..., 5_N).

The central piece of equipment 2 is piece of electronic equipment, e.g. an avionics computer, a controller, or a data concentrator.

The remote pieces of equipment 4 are also pieces of electronic equipment, e.g. sensors (where the term "sensor" is used to mean equipment comprising a unit that acquires signal(s) or data) together with various electronic components enabling such measurements to be transmitted, possibly after being processed.

During a communication cycle, the central communication unit 3 sends a downlink frame 6_1 (e.g. containing an acquisition request) to the subscriber communication unit 5_1, which responds by returning an uplink frame 7_1 (e.g. containing one or more measurements). The central communication unit 3 then returns a downlink frame 8_1 containing an acknowledgement. During the communication cycle, these operations are repeated for all of the subscriber communication units 5: at the end of the communication cycle, the central communication unit 3 sends a downlink frame 6_N to the $N^{th}$ subscriber communication unit 5_N, which responds by returning an uplink frame 7_N, with the central communication unit 3 then returning the downlink frame 8_N containing the acknowledgement. All of these operations are repeated during each communication cycle.

That protocol is said to be "centralized", since it requires the central communication unit 3 for organizing the sequencing of the frames being exchanged.

That protocol presents the following drawbacks.

The number of frames exchanged during each communication cycle is large, being equal to 3.N, such that exchanges in that protocol are not very efficient. A consequence of such poor efficiency is a relatively high level of consumption of electricity by the wireless communication system 1 (since numerous exchanges are necessary in order to communicate a given amount of data). Furthermore, that wireless communication system 1 presents availability that is relatively low.

OBJECT OF THE INVENTION

An object of the invention is to provide a communication protocol that is adapted to performing wireless communication in an aircraft and that does not present the above-mentioned drawbacks.

SUMMARY OF THE INVENTION

In order to achieve this object, there is provided a central communication unit arranged to communicate wirelessly during successive communication cycles with a plurality of subscriber communication units, the central communication unit comprising:

transmitter means arranged, during each communication cycle, to transmit a single global downlink frame addressed to all of the subscriber communication units, the global downlink frame comprising a plurality of data packets, each addressed to a respective one of the subscriber communication units, the global downlink frame supplying a common reference time to all of the subscriber communication units so that, after receiving the global downlink frame, each subscriber communication unit can start transmitting an uplink frame at the end of a waiting interval starting at the common reference time and having a duration equal to a respective waiting duration that is associated with said subscriber communication unit, the waiting durations all being different and being defined in such a manner as to avoid collisions between the uplink frames; and receiver means arranged, during said communication cycle, to receive in succession the uplink frames transmitted by each of the subscriber communication units.

The central communication unit of the invention makes it possible to perform wireless communication while greatly reducing the number of frames that are exchanged on each communication cycle: specifically N+1 instead of 3N in a configuration with N subscriber communication units. This minimizes the time resources needed for such exchanges, and improves their efficiency, while reducing the overall consumption of electricity by the wireless communication system incorporating the central communication unit and the subscriber communication units.

The operation of the central communication unit, and in particular the way in which it times the frames being exchanged, makes it easy to configure one or more shadow central units and one or more shadow subscriber units within the wireless communication system that act in a manner that is transparent, the shadow central units serving to listen to the other central communication units and, if necessary, to take over from them, and the shadow subscriber units serving to listen to the other subscriber communication units and to repeat transmission of their uplink frames in case that might be necessary. This significantly improves the availability of the wireless communication system by introducing redundancy in the exchanges.

It should also be observed that the wireless communication system incorporating the central communication unit can easily be upgraded. For example, it is very simple to add new subscriber communication units to the wireless communication system. Specifically, a subscriber communication unit needs only to know its own identifier in order to be capable of being incorporated in the wireless communication system to exchange frames with the central communication unit.

There is also provided a central communication unit as described above, wherein the common reference time is the end-of-reception moment at which the subscriber communication units cease receiving the global downlink frame.

There is also provided a central communication unit as described above, wherein each data packet of the global downlink frame addressed to a subscriber communication unit includes an acknowledgement that makes it possible to verify whether an uplink frame transmitted by said subscriber communication unit during a preceding communication cycle was, or was not, received correctly.

There is also provided a central communication unit as described above, wherein each data packet of the global downlink frame addressed to a subscriber communication unit includes the waiting duration that is associated with said subscriber communication unit.

There is also provided a central communication unit as described above, the central communication unit being configurable to be a master central unit or else to be a shadow central unit, the central communication unit being arranged, when it is a shadow central unit, to monitor a master central unit without itself transmitting global downlink frames, and to take the place of the master central unit in the event of a failure of the master central unit.

There is also provided a central communication unit as described above, the central communication unit being arranged, when it is a shadow central unit, to acquire the global downlink frames transmitted by the master central unit, and to take the place of the master central unit when the master unit is no longer transmitting global downlink frames.

There is also provided a central communication unit as described above, the central communication unit being arranged to cooperate with one or more other central communication units in such a manner that the central communication units act together in autonomous manner to be configured so as to define one master central unit and one or more shadow central units.

There is also provided a central communication unit as described above, wherein the receiver means include monitor means arranged to interrupt the transmission of download global frames by the transmitter means when the transmission of global downlink frames is faulty.

There is also provided electronic equipment incorporating a central communication unit as described above.

There is also provided a communication method performed in a central communication unit as described above, and comprising the following successive steps performed during communication cycles:
  during each communication cycle, transmitting a single global downlink frame addressed to all of the subscriber communication units, the global downlink frame comprising a plurality of data packets, each addressed to a respective one of the subscriber communication units, the global downlink frame supplying a common reference time to all of the subscriber communication units so that, after receiving the global downlink frame, each subscriber communication unit can start transmitting an uplink frame at the end of a waiting interval starting at the common reference time and having a duration equal to a respective waiting duration that is associated with said subscriber communication unit, the waiting durations all being different and being defined in such a manner as to avoid collisions between the uplink frames; and
  during said transmission cycle, receiving in succession the uplink frames transmitted by each of the subscriber communication units.

There is also provided a communication method as described above, further comprising the steps, during each communication cycle, of starting a time counter and of transmitting the global downlink frame when the current value of the time counter reaches a predetermined reference duration of the communication cycle.

There is also provided a computer program including instructions for causing the above-described central communication unit to execute the steps of the above-described communication method.

There is also provided a computer-readable storage medium, storing the above-described computer program.

There is also provided a subscriber communication unit arranged to communicate wirelessly during successive communication cycles with a central communication unit, the subscriber communication unit having an identifier that is specific thereto and comprising:
  receiver means arranged, during each communication cycle, to receive a global downlink frame transmitted by the central communication unit, to use the identifier to identify and acquire a data packet that is addressed thereto in the global downlink frame, and to determine a common reference time from the global downlink frame; and
  transmitter means arranged, at the end of a waiting interval starting at the common reference time and having a waiting duration that is associated with said subscriber communication unit, to transmit an uplink frame to the central communication unit.

There is also provided a subscriber communication unit as described above, wherein the common reference time is the end-of-reception moment at which the subscriber communication unit ceases receiving the global downlink frame.

There is also provided a subscriber communication unit as described above, wherein the waiting duration that is associated with the subscriber communication unit is incorporated in the data packet that is addressed thereto in the global downlink frame.

There is also provided a subscriber communication unit as described above, wherein the waiting duration that is associated with the subscriber communication unit is determined locally by the subscriber communication unit itself, or else is previously loaded in the subscriber communication unit.

There is also provided a subscriber communication unit as described above, the subscriber communication unit being configurable to be a shadow subscriber unit, the subscriber communication unit being arranged, when it is a shadow subscriber unit, to act systematically during each communication cycle to acquire another uplink frame transmitted by another subscriber communication unit, and also itself to transmit that other uplink frame to the central communication unit.

There is also provided a subscriber communication unit as described above, the subscriber communication unit being arranged to transmit that other uplink frame following its own uplink frame by concatenating the frames.

There is also provided electronic equipment incorporating a subscriber communication unit as described above.

There is also provided a communication method performed in a subscriber communication unit and arranged to communicate wirelessly with a central communication unit, the subscriber communication unit having an identifier that is specific thereto, and the method comprising the following steps implemented during successive communication cycles:
  during each communication cycle, receiving a global downlink frame transmitted by the central communication unit, using the identifier to identify and acquire a data packet that is addressed thereto in the global downlink frame, and determining a common reference time from the global downlink frame; and during said communication cycle, at the end of a waiting interval starting at the common reference time and having a waiting duration that is associated with said subscriber communication unit, transmitting an uplink frame to the central communication unit.

There is also provided a communication method as described above, further comprising the following steps after receiving a global downlink frame:

starting a first time counter and a second time counter at the common reference time;

starting transmission of the uplink frame when the current value of the second time counter reaches the waiting duration;

if the current value of the first time counter reaches the predetermined reference duration before a following global downlink frame is received correctly, re-starting the first time counter and the second time counter;

if the current value of the second counter reaches a duration equal to the waiting duration without a following global downlink frame being received, incrementing by one unit a third counter for counting global downlink frames that have been lost; and verifying that the current value of the third counter is less than a predetermined number, and if so, transmitting an uplink frame.

There is also provided a computer program including instructions for causing the above-described subscriber communication unit to execute the steps of the above-described communication method.

There is also provided a computer-readable storage medium, having stored thereon the above-described computer program.

There is also provided a wireless communication system comprising at least one central communication unit as described above and a plurality of subscriber communication units as described above.

There is also provided a wireless communication system as described above, including three central communication units as described above, the central communication units being configured to comprise a master central unit, a first shadow central unit, and a second shadow central unit.

There is also provided an aircraft including a wireless communication system as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
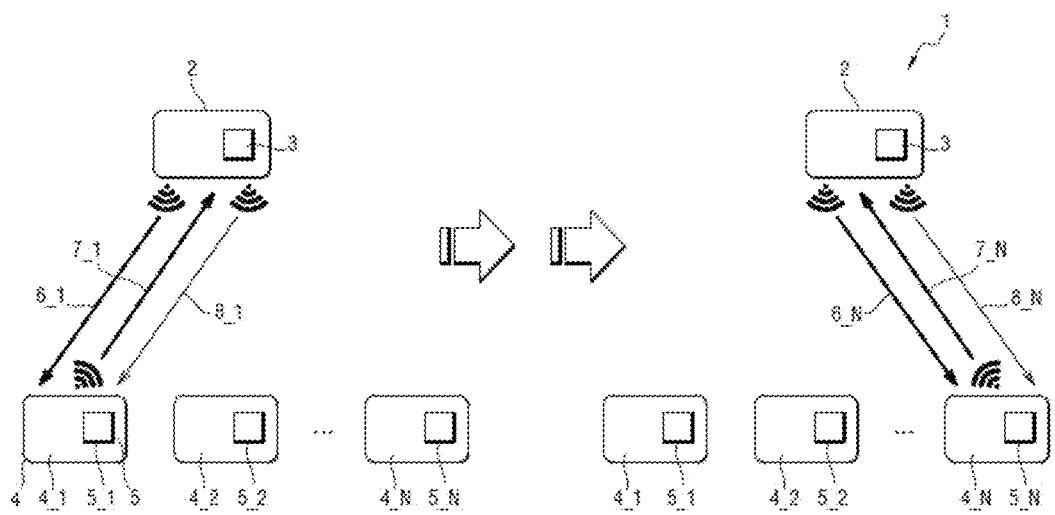
FIG. 1 shows a prior art wireless communication system.
Figure 2:
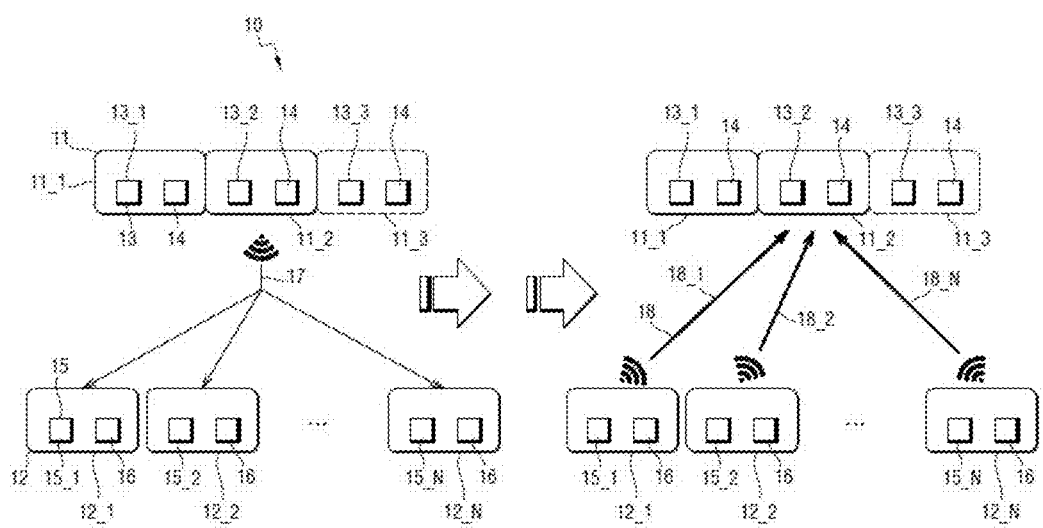
FIG. 2 shows a wireless communication system of the invention comprising central communication units and subscriber communication units.

With reference to FIG. 2, the wireless communication system 10 of the invention is embedded in an aircraft and comprises one or more central pieces of equipment 11 (11_1, 11_2, 11_3) and a plurality of remote pieces of equipment 12, specifically N remote pieces equipment 12 (12_1, 12_2, . . . , 12_N). In this example, the pieces of central equipment 11 are data concentrators (in the general sense) and the remote pieces of equipment 12 are sensors. The data concentrators 11 and the sensors 12 may be located inside or outside the fuselage, e.g. in the cockpit, on the wings, on or in the engines, the landing gear, etc.

Each data concentrator 11 includes a central communication unit 13 and a processor module 14 that produces and acquires the frames that are exchanged by the central communication unit 13. The processor module 14 includes a processor component that, by way of example, may be a microcontroller, a processor, or indeed a programmable logic circuit such as a field programmable gate array (FPGA) or an application specific integrated circuit (ASIC).

Each central communication unit 13 includes transmitter means, receiver means, and at least one processor component.

The transmitter means comprise a radiofrequency (RF) transmitter and at least one antenna. The receiver means comprise an RF receiver and at least one antenna (possibly the same antenna as the transmitter means). The processor component is adapted to execute instructions of a program in order to perform some or all of the steps of the communication method as described below. By way of example, the processor component may be a processor, a microcontroller, or indeed a programmable logic circuit such as an FPGA or an ASIC. The processor component of the central communication unit 13 may be the same as the processor component of the processor module 14.

Each data concentrator 11 is connected by a wired connection to a core communication network of the aircraft, or else to some other piece of equipment (e.g. to an avionics computer).

Each sensor 12 includes a subscriber communication unit 15 and a processor module 16 that produces and acquires the frames that are exchanged by the subscriber communication unit 15. The processor module 16 includes a processor component that, by way of example, may be a processor, a microprocessor, or indeed a programmable logic circuit such as an FPGA or an ASIC.

Each subscriber communication unit 15 includes transmitter means, receiver means, and at least one processor component.

The transmitter means comprise an RF transmitter and at least one antenna. The receiver means comprise an RF receiver and at least one antenna (possibly the same antenna as the transmitter means). The processor component is adapted to execute instructions of a program in order to perform some or all of the steps of the communication method as described below. By way of example, the processor component may be a processor, a microcontroller, or indeed a programmable logic circuit such as an FPGA or an ASIC. The processor component of the subscriber communication unit 15 may be the same as the processor component of the processor module 16.

Each subscriber communication unit 15 possesses a unique identifier that is specific thereto.

The system 10 operates on the following principle. Only one of the central communication units 13 is active, specifically the unit 13_1, and it communicates by wireless communication with all of the subscriber communication units 15 during successive communication cycles. The other two central communication units 13_2 and 13_3 have a listening role that is described below. During each communication cycle, the active central communication unit 13_1 sends a single global downlink frame 17 to all of the subscriber communication units 15.

This global downlink frame 17 is unique and common for all of the subscriber communication units 15: during any given communication cycle, only one global downlink frame 17 is transmitted by the central communication unit 13_1 and it is received by all of the subscriber communication units 15. The format of the global downlink frame is constant for all communication cycles, but its content varies with varying communication cycle.

Each subscriber communication unit 15 then sends an uplink frame 18 to the central communication unit 13: the subscriber communication unit 15_1 sends an uplink frame 18_1, the subscriber communication unit 15_2 sends an uplink frame 18_2, . . . , and the subscriber communication unit 15_N sends an uplink frame 18_N. Thus, during each communication cycle, only N+1 frames are exchanged.

Figure 3:
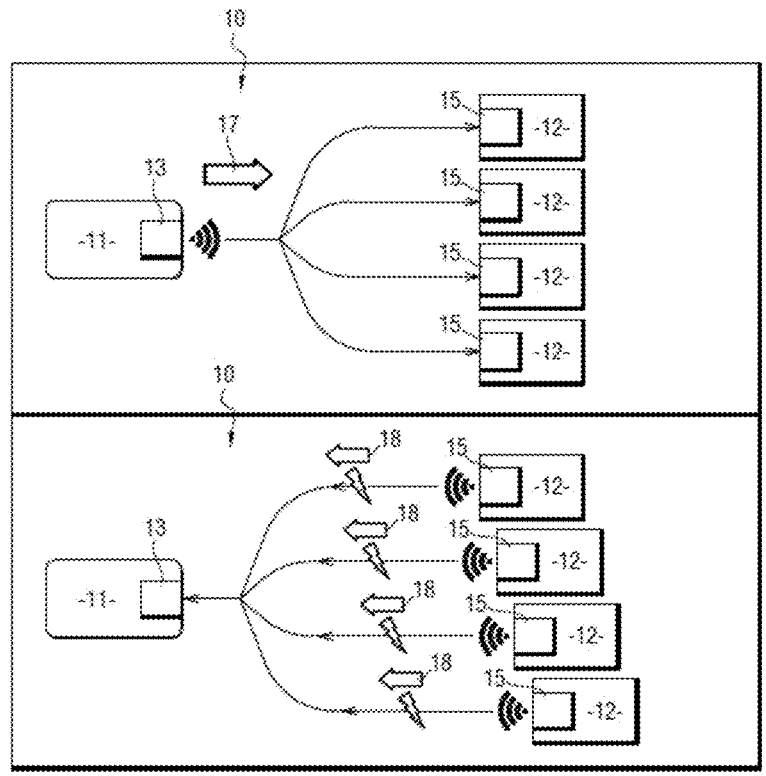
FIG. 3 shows frames being exchanged in the wireless communication system.

With reference to FIG. 3, there follows a more detailed description of the operation of the wireless communication system 10 in the situation where the system has a single central communication unit 13 (which is therefore active).

The wireless communication system 10 operates in successive communication cycles. Each communication cycle has a predetermined reference duration, which is known to the central communication unit. The predetermined reference durations of communication cycles may optionally all be equal. The predetermined reference durations are acquired by the central communication unit (but they could optionally be prepared by the central communication unit).

During a communication cycle, the transmitter means of the active central communication unit 13 send a global downlink frame 17 to the N subscriber communication units 15. The global downlink frame 17 is received by the receiver means of each of the subscriber communication units 15. The transmitter means of each subscriber communication unit 15 then transmit a respective uplink frame 18 to the central communication unit 13. Each subscriber communication unit 15 transmits a single uplink frame 18 per communication cycle (with the possible exception of shadow subscriber units, which are described below). In this example, there are no operational data exchanges between the subscriber communication units 15.

Both downlink and uplink communication make use of the same single frequency band. An innovative centralized communication protocol is performed to enable the central communication unit 13 and the subscriber communication units 15 to communicate over a single frequency band while avoiding frame collisions.

The communication protocol is based on a principle that is close to the principle of time division multiple access (TDMA).

Each global downlink frame 17 that is transmitted during a communication cycle comprises a plurality of data packets, each associated with a respective one of the subscriber communication units 15 by means of its identifier. The global downlink frame 17 also provides a common reference time to all of the subscriber communication units 15. In this example, the common reference time is the end-of-reception moment at which the subscriber communication units 15 cease receiving the global downlink frame 17.

After receiving the global downlink frame 17, each subscriber communication unit 15 starts transmitting an uplink frame 18 at the end of a waiting time interval that begins at the common reference time, i.e. at the end-of-reception moment for the global downlink frame 17. The waiting time interval has a duration that is equal to a specific waiting duration that is associated with said subscriber communication unit 15, with the waiting durations all being different and being defined in such a manner as to avoid collisions between the uplink frames.

Figure 4:
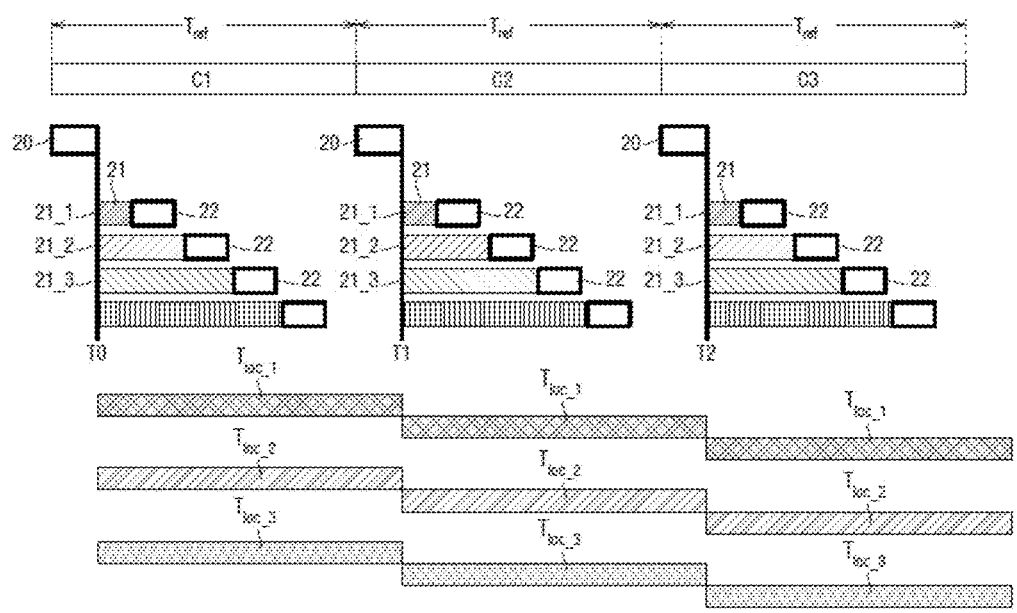
FIG. 4 shows the timing of the frames being exchanged in the wireless communication system.

The above description is illustrated with reference to FIG. 4, which shows a succession of a first communication cycle C1, a second communication cycle C2, and a third communication cycle C3. In this example, the communication cycles all present the same predetermined reference duration Tref, which duration is loaded into the central communication unit 13.

When the first communication cycle C1 begins, the central communication unit 13 starts a downlink transmission period 20 during which it transmits the global downlink frame.

The common reference time T0 is the end-of-reception moment at which the subscriber communication units 15 cease receiving the global downlink frame.

By means of its identifier, each subscriber communication unit extracts from the global downlink frame the data packet that is being sent thereto. The data packet comprises a command together with functional data, e.g. a request to acquire measurements together with the waiting duration that is associated with said subscriber communication unit. The data packet also includes an acknowledgement that enables the subscriber communication unit to verify whether an uplink frame previously transmitted by said subscriber communication unit, specifically the uplink frame transmitted during the preceding communication cycle, was (or was not) correctly received by the central communication unit. The global downlink frame also contains the predetermined reference duration Tref of the current communication cycle. The global downlink frame also contains a frame number.

The subscriber communication unit 15 transfers the functional data to the processor module of the sensor 12 in which the subscriber communication unit 15 is incorporated.

Each subscriber communication unit 15 begins transmitting an uplink frame at the end of a waiting time interval that begins at the end-of-reception moment (the common reference time T0) and that has a duration equal to the waiting duration 21 that is associated with said subscriber communication unit. By way of example, the uplink frame contains one or more measurements taken by the sensor in which the subscriber communication unit is incorporated. The uplink frame also contains the local reference duration Tloc (Tloc_1, Tloc_2, Tloc_3, etc.) of the communication cycle, which is the duration of the communication cycle taken into account by the subscriber communication unit in order to time the transmission of the uplink frame, and which normally corresponds to the predetermined reference duration included in the global downlink frame that has just been received. The uplink frame also contains the waiting duration that was taken into account by the subscriber communication unit for timing the transmission of the uplink frame. The uplink frame also contains a unique identifier of the subscriber communication unit together with a frame number (which is specifically the number of the frame of the most recent global downlink frame taken into account by the subscriber communication unit).

The waiting durations 21 are all different and they are defined so as to avoid collisions between the uplink frames, in particular by taking account of the number of subscriber communication units and of the uplink transmission duration 22 that is needed by each subscriber communication unit to transmit its uplink frame.

The term "uplink local duration" is used to designate the sum of the waiting duration plus the uplink transmission duration associated with a subscriber communication unit.

It can be seen that the uplink local duration (=21_1+22) associated with the first subscriber communication unit is shorter than the waiting duration 21_2 associated with the second subscriber communication unit, that the uplink local duration (=21_2+22) associated with the second subscriber communication unit is shorter than the waiting duration 21_3 associated with the third subscriber communication unit, etc. This serves to segregate the uplink frames in time, thereby avoiding any collision.

The second communication cycle and the third communication cycle are similar to the first communication cycle.

In this example, each communication cycle has a predetermined reference duration Tref that is equal to 500 microseconds (µs). Naturally, this duration could be different.

The shortest uplink local duration (i.e. in this example the uplink local duration associated with the first subscriber communication unit) is equal to 10 µs. In this example, each uplink local duration is 10 µs longer than the immediately shorter uplink local duration (incrementing in steps of 10 µs). The duration for transmitting all of the uplink frames is equal to a maximum of 100 µs. Naturally, this duration could be different. This configuration enables twenty subscriber communication units to communicate with a central communication unit during each communication cycle.

It should also be observed that the central communication unit and the subscriber communication units are to be found by default in a receive mode in which the receiver means are active and the transmitter means are inactive, except when they are transmitting a frame, and then they are in a transmit mode in which the transmitter means are active and the receiver means are inactive. In this example, the maximum time for switching from one mode to the other is equal to 500 nanoseconds (ns).

Figure 5:
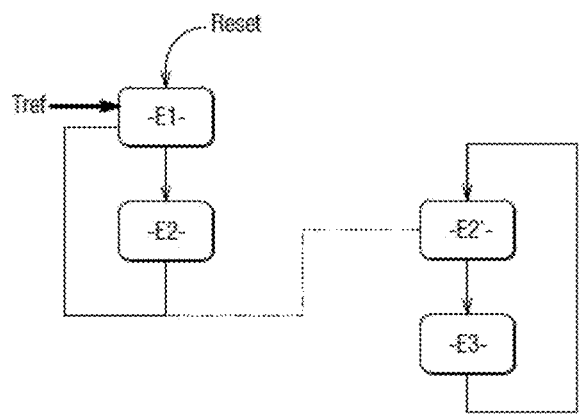
FIG. 5 shows steps of a method performed in a central communication unit in order to time the sending of global downlink frames.

With reference to FIG. 5, there follows a description of the method performed by the central communication unit to time the transmission of the global downlink frames. A time counter is implemented in the central communication unit.

Whenever it is initialized (or re-initialized), the method starts with a step E1. The predetermined reference duration Tref of the communication cycle is acquired and it is loaded into the time counter. The time counter starts autonomously, and its current value is incremented.

So long as the current value of the time counter has not reached the predetermined reference duration, the central communication unit waits (steps E2 and E2').

When the current value of the time counter reaches the predetermined reference duration, step E1 is restarted and, simultaneously, the central communication unit starts transmitting the global downlink frame (step E3). At the end of transmitting the global downlink frame, the method returns to step E2'.

Figure 6:
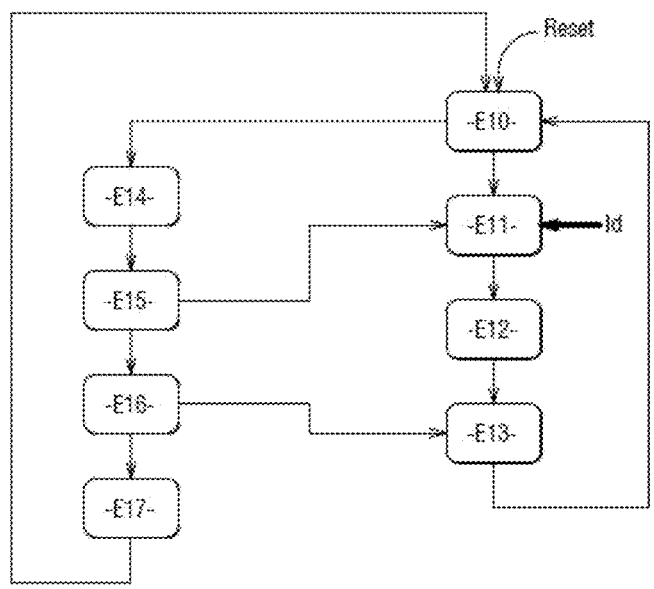
FIG. 6 shows steps of a method performed in a subscriber communication unit in order to time the sending of uplink frames.

With reference to FIG. 6, there follows a description of the method performed by each subscriber communication unit to time the transmission of the global downlink frames.

A first time counter, a second time counter, and a third counter for counting lost global downlink frames are implemented in the subscriber communication unit.

Whenever the method is initialized (or re-initialized), the subscriber communication unit waits to receive a global downlink frame, or else for the current value of the first time counter to reach the local reference duration for the communication cycle (step E10).

When the method reaches step E10 and the subscriber communication unit has received a first global downlink frame that is correct, the method moves on to a step E11.

When the method is at step E11, the subscriber communication unit resets the third counter to zero.

The subscriber communication unit extracts the predetermined reference duration for the communication cycle from the global downlink frame, and it stores that duration: the predetermined reference duration becomes the "new" local reference duration that is used by the subscriber communication unit. The subscriber communication unit acquires its own identifier Id and it extracts the waiting duration that has been allocated thereto from the global downlink frame by using that identifier.

The first time counter and the second time counter start at the common reference time, i.e. from the end-of-reception moment for receiving the global downlink frame.

After step E11, the method moves on to a step E12, during which the subscriber communication unit waits for the current value of the second counter to reach the waiting duration.

When that happens, the subscriber communication unit starts transmitting an uplink frame to the central communication unit (step E13). The method returns to step E10.

When the method is at step E10, if the current value of the first counter reaches the local reference duration (which is equal to the stored predetermined reference duration) before a following global downlink frame has been received correctly, then the subscriber communication unit restarts the first time counter and the second time counter (step E14).

The subscriber communication unit then waits until a following global downlink frame has been received, or else until the current value of the second time counter has reached the waiting duration. If the following global downlink frame is received before the current value of the second time counter has reached the waiting duration, the method moves on to step E11. The new predetermined reference duration, contained in the global downlink frame, becomes the new local reference duration that is used by the subscriber communication unit.

In contrast, if the current value of the second time counter reaches a duration equal to the waiting duration without a following global downlink frame being received, then the method moves on to a step E16. The subscriber communication unit detects the loss of a global downlink frame, and the third counter is incremented by unity.

The subscriber communication unit verifies that the current value of the third counter is less than a predetermined number.

If the current value of the third counter is strictly less than 3, the method moves on to the step E13: the subscriber communication unit transmits an uplink frame.

If the current value of the third counter is greater than or equal to 3, then the subscriber communication unit does not transmit the uplink frame (step E17).

The method returns to step E10.

It can be seen that the protocol implemented can accommodate the loss of a predetermined number of consecutive global downlink frames: the subscriber communication unit continues to transmit uplink frames so long as the number of successive global downlink frames that have been lost remains less than or equal to the predetermined number. In this example, the predetermined number is equal to 2, but it could have some other value.

Figure 7:
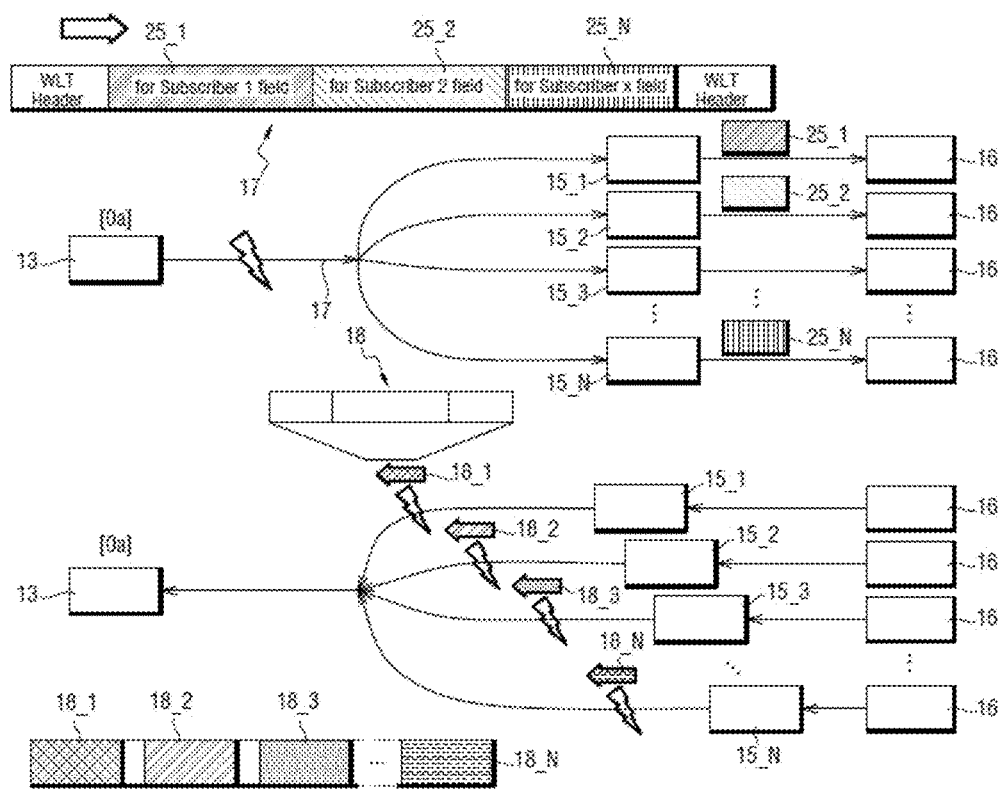
FIG. 7 shows frames being exchanged in the wireless communication system.

The above is summarized with reference to FIG. 7.

The central communication unit 13, having the identifier [0a], transmits a download global frame 17 to the subscriber communication units 15. Each subscriber communication unit 15 extracts from the global downlink frame 17 the data packet 25 that is associated therewith: the subscriber communication unit 15_1 acquires the data packet 25_1, the subscriber communication unit 15_2 acquires the data packet 25_2, . . . , and the subscriber communication unit 15_N acquires the data packet 25_N.

Each data packet 25 contains functional data, the waiting duration that is associated with the subscriber communication unit 15 and the acknowledgement. The subscriber communication unit 15 also extracts both the predetermined reference duration for the communication cycle and also the downlink frame number from the global downlink frame 17.

The subscriber communication unit 15 transfers the functional data to the processor module 16 of the sensor 12 in which the subscriber communication unit 15 is incorporated.

Each subscriber communication unit 15 begins transmitting an uplink frame 18 at the end of a waiting time interval that begins at the end-of-reception moment for the global downlink frame 17 and that has a duration equal to the waiting duration that is specific to said subscriber communication unit 15.

The central communication unit 13 thus receives the uplink frames 18 in series, in the form of a string of frames containing all of the uplink frames 18 that are concatenated and that are separated from one another by spaces of constant duration: the uplink frame 18_1 transmitted by the subscriber communication unit 15_1, the uplink frame 18_2 transmitted by the subscriber communication unit 15_2, . . . , the uplink frame 18_N transmitted by the subscriber communication unit 15_N.

Figure 8:
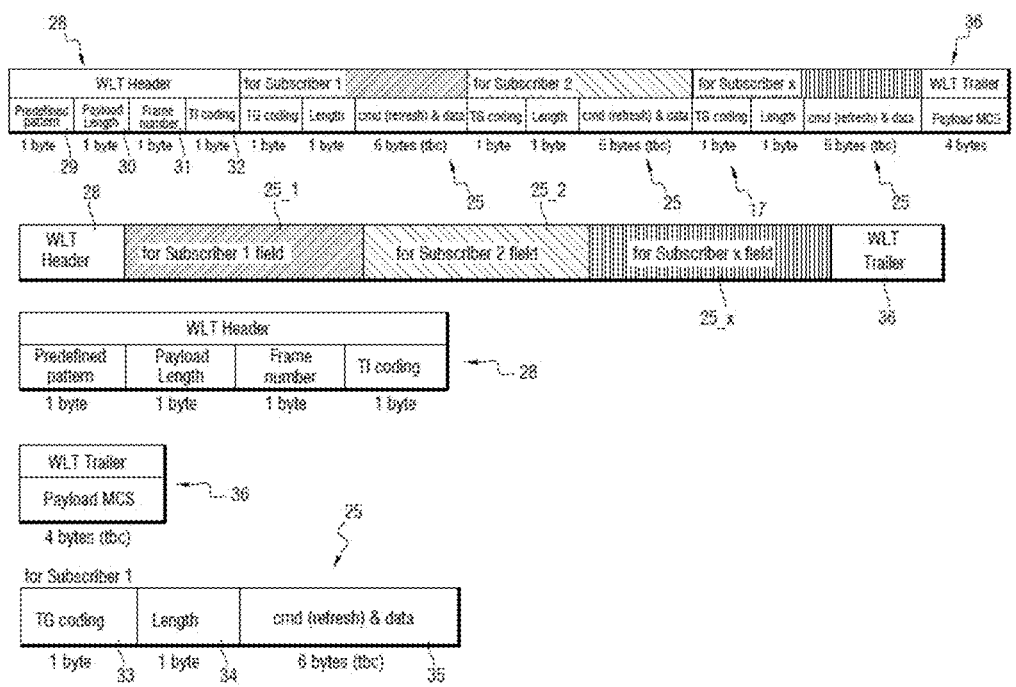
FIG. 8 shows the elements constituting a global downlink frame.
Figure 9:
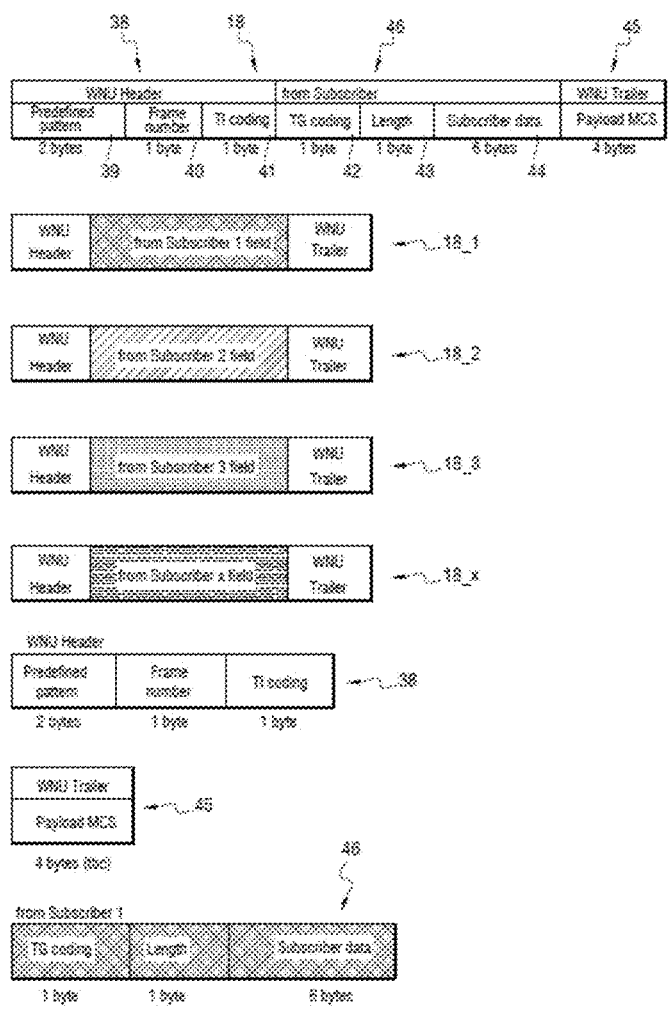
FIG. 9 shows the elements constituting an uplink frame.

With reference to FIGS. 8 and 9, there follows a description of the content of the frames exchanged between the central communication unit and the subscriber communication units.

The global downlink frame 17 contains firstly a header 28 comprising a predefined bit sequence 29 (on 1 "octet" or 8-bit byte), a field 30 containing the length of the global downlink frame (on 1 byte), a field 31 comprising a number for the global downlink frame (on one byte), and a field 32 comprising the predetermined reference duration (on 1 byte). The predefined bit 29 defines in unique manner the central communication unit 13 that transmitted the global downlink frame, depending on whether it was transmitted by the master central communication unit 13_1, or else by one of the shadow central communication units 13_2 or 13_3 (see below).

It should be observed at this point that each subscriber communication unit, on receiving a global downlink frame, verifies that the number of said global downlink frame is indeed one unit greater and the number of the preceding global downlink frame. This verification includes passing from 255 to 1, since the frame number equal to 0 corresponds solely to the frame used when the central communication unit exits from a reset: i.e. it is the number of the first global downlink frame that is transmitted by the central communication unit after a reset.

The global downlink frame 17 also contains a plurality of data packets 25, each addressed to a respective one of the subscriber communication units. Each data packet 25 that is addressed to a subscriber communication unit contains a field 33 comprising the waiting duration that is associated with said subscriber communication unit (on 1 byte), a field 34 comprising the length of the data packet 25 together with an acknowledgement for validating or invalidating proper reception of the preceding uplink frame by the central communication unit (on 1 byte), and a field 35 comprising functional data (on 6 bytes).

The global downlink frame 17 ends with a trailer 36 on 4 bytes comprising a field containing a check sequence making it possible on reception to check the integrity of the global downlink frame (and thus its coherence) by means of the code used on transmitting the frame. In this example it is a global frame check sequence (FCS) for the global downlink frame 17.

Each uplink frame 18 transmitted by a subscriber communication unit contains initially a header 38 that comprises a predefined bit sequence 39 (on 2 bytes), a field 40 comprising a number for said uplink frame (on 1 byte), and a field 41 comprising the local reference duration taken into account for the communication cycle (on 1 byte). The number of the uplink frame is the number of the most recent global downlink frame taken into account by the subscriber communication unit.

The predefined bit sequence 39 contains the identifier of the subscriber communication unit, so that the central communication unit can verify that it has indeed received the uplink frames coming from a subscriber communication unit with which it is supposed to be in communication. The predefined bit sequence 39 uses coding to enable each subscriber communication unit to be identified uniquely. By way of example, the coding relationship could take account of the value of P Id acquired by the subscriber communication unit at its physical location (required), optionally together with other parameters that are more variable (frame number, value of the reference duration).

The uplink frame 18 also contains a data packet containing a field 42 comprising the waiting duration that is associated with said subscriber communication unit (1 bytes), a field 43 comprising the length of the uplink frame (on 1 byte), and a field 44 containing functional data (6 bytes).

The uplink frame 18 ends with a trailer 45 on 4 bytes comprising a field containing a check sequence making it possible on reception to check the integrity of the uplink frame (and thus its coherence) by means of the code used on transmitting the frame. In this example it is a global frame check sequence (FCS) for the uplink frame 18. Each uplink frame 18 thus extends over 16 bytes.

The central communication unit verifies in particular the local reference duration and the waiting duration that were used by the subscriber communication unit, in order to ensure that the subscriber communication unit sends uplink frames with the correct timing.

Figure 10:
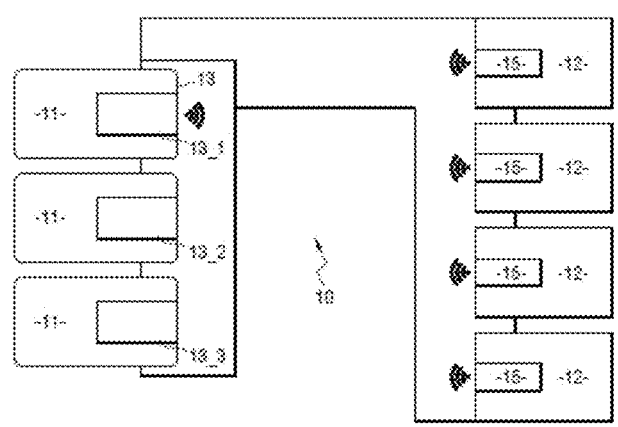
FIG. 10 shows a wireless communication system comprising a master central unit and two shadow central units, together with subscriber communication units.
Figure 11:
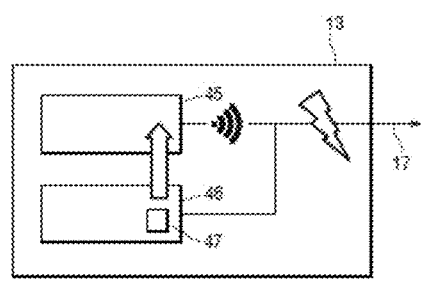
FIG. 11 shows a central communication unit.

With reference to FIGS. 10 and 11, there follows a description of the operation of the wireless communication system 10 in the situation where the system has a plurality of central communication units.

In this example, the wireless communication system includes three central pieces of equipment 11, each of which incorporates a respective central communication unit 13, together with N remote pieces of equipment 12, each of which incorporates a respective subscriber communication unit 15.

In this example, each central communication unit can be configured to be a master central unit or else to be a shadow central unit.

The function of a shadow central unit is to monitor the master central unit by listening to the global downlink frames, while not transmitting any frames itself, and to take over from the master central unit in the event of the master central unit failing.

In this example, the wireless communication system has a master central unit 13_1, a first shadow central unit 13_2, and a second shadow central unit 13_3.

The first shadow central unit 13_2 monitors the master central unit 13_1 and takes over from it in the event of failure. The second shadow central unit 13_3 monitors the first shadow central unit 13_2 and takes over from it in the event of failure.

The three central communication units 13 co-operate with one another in autonomous manner in order to determine which central communication unit 13 is to perform the function of the master central unit, which central communication unit 13 is to perform the function of the first shadow central unit, and which central communication unit 13 is to perform the function of the second shadow central unit. This configuration is performed using a protocol that is decentralized, and that therefore does not require the use of any additional resource. This configuration is dynamic configuration that varies in real time in the event of the master central unit failing.

With reference to FIG. 11, each central communication unit 13 has transmitter means 45 and receiver means 46 (as explained above). The receiver means 46 include monitor means 47. The monitor means 47 of the active central communication unit, i.e. the master central unit 13_1, acquire the global downlink frames produced by the master central unit 13_1. When the monitor means 47 detect a failure in the transmission of the global downlink frames, the monitor means 47 deactivate the transmitter means 45. A failure is detected when the transmitter means 45 no longer comply with the time constraints for transmitting the global downlink frames, or else when the transmitter means 45 no longer transmit the global downlink frames, or indeed when the transmitted global downlink frames are corrupt.

The first shadow central unit 13_2 monitors the master central unit 13_1 by acquiring the global downlink frames 17 that it transmits. When the master central unit does not transmit global downlink frames 17 during a predetermined number of successive communication cycles, the first shadow central unit 13_2 takes over from the master central unit 13_1 and in turn becomes the master central unit. In this example, the predetermined number is equal to 2, but it could have some other value. The master central unit 13_1 might not be transmitting global downlink frames because its own transmitter means 45 have been deactivated by the monitor means 47 of its receiver means 46, or there might be some other reason, e.g. a failure or a power supply problem impacting the operation of the master central unit 13_1.

The second shadow central unit 13_3 then monitors the central unit 13_2 that used to be the first shadow central unit and that has become the master central unit in the same manner as the first shadow central unit 13_2 used to monitor the central unit 13_1 that used to be the master unit.

Figure 12:
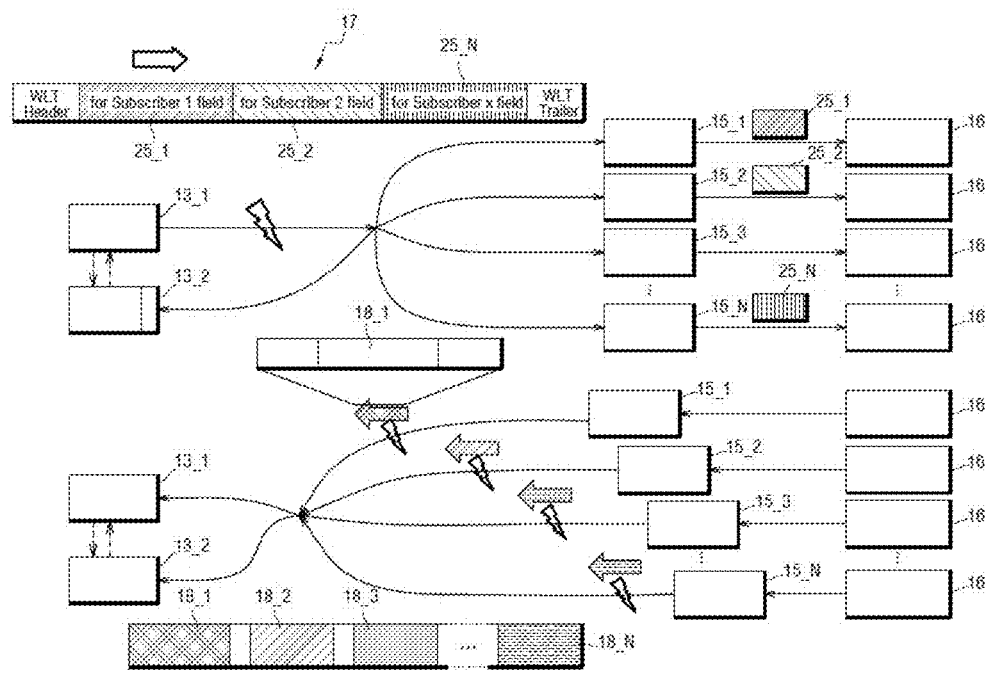
FIG. 12 shows frames being exchanged in a wireless communication system including both a master central unit and also a shadow central unit.

FIG. 12 shows the operation of the wireless communication system 10 in the event of nominal operation.

The master central unit 13_1 transmits the same global downlink frame 17 to all of the subscriber communication units 15. Each subscriber communication unit 15 extracts from the global downlink frame 17 both the data packet 25 that is addressed thereto and also the predetermined reference duration of the communication cycle.

Each subscriber communication unit 15 transmits an uplink frame 18 to the master central unit 13_1.

The first shadow central unit 13_2 monitors the master central unit 13_1 by acquiring the global downlink frame 17. Since the global downlink frame 17 is indeed present and is not corrupt, the first shadow central unit 13_2 does not intervene actively and does no more than monitor the master central unit 13_1.

Figure 13:
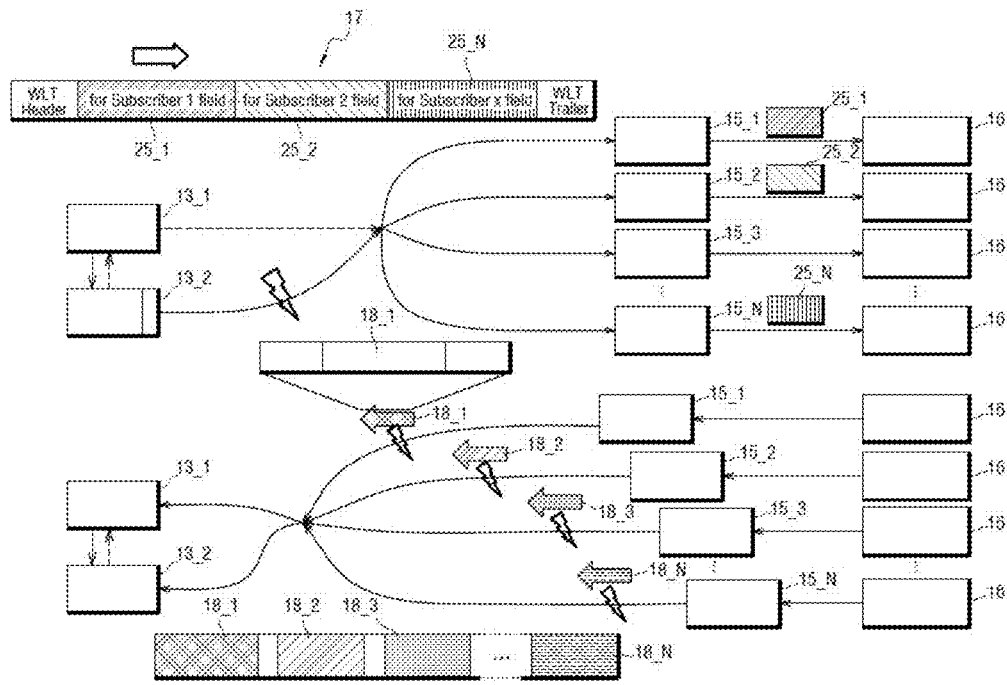
FIG. 13 is a figure similar to FIG. 12, where the first shadow central unit has taken over from the master central unit.

With reference to FIG. 13, in the event of a failure of the master central unit 13_1, the monitor means of the receiver means of the master central unit 13_1 deactivate the transmitter means of the master central unit 13_1.

The first shadow central unit 13_2 detects that the master central unit 13_1 is no longer transmitting global downlink frames 17, and it takes over from the master central unit 13_1 by transmitting global downlink frames 17. The predetermined reference duration and the waiting durations that are stored in the first shadow central unit 13_2 are the same as those stored in the master central unit 13_1. The sequencing in time of the exchanges of frames between the first shadow central unit 13_2 and the subscriber communication units 15 is identical to the sequencing in time of the exchanges of frames between the master central unit 13_1 and the subscriber communication units 15. The replacement of the master central unit 13_1 by the first shadow central unit 13_2 is thus completely transparent for the subscriber communication units 15. The first shadow central unit 13_2, which has become the master central unit, acquires the uplink frames 18.

Each subscriber communication unit can also be configured so as to be a shadow subscriber unit or else a normal subscriber unit. A shadow subscriber unit monitors one or more normal subscriber units.

A shadow subscriber unit acquires the uplink frames transmitted by (at least one) normal subscriber unit, and in turn it relays them systematically to the central communication unit.

This thus amounts to a shadow subscriber unit re-transmitting a frame that has already been transmitted by another subscriber unit and that might potentially be corrupted on arrival at the central communication units, therefore requiring duplication with transmission that is offset in time as performed by the shadow subscriber unit(s).

A shadow subscriber unit transmits the uplink frame of the normal subscriber unit immediately after its own uplink frame. The two uplink frames are concatenated by the shadow subscriber unit. Concatenating frames makes it possible to avoid modifying the structure of the frames transmitted by the shadow subscriber unit. It is therefore very simple to configure a subscriber communication unit so that it performs the function of a shadow subscriber unit.

This avoids the loss of uplink frames that could result from using a single radiofrequency channel for communication between the central communication unit and the subscriber communication units.

One or more shadow subscriber units are therefore allocated to each subscriber communication unit (which is thus a normal subscriber unit relative to those shadow subscriber units). Naturally, a shadow subscriber unit listening to a normal subscriber unit is itself also listened to by some other subscriber communication unit.

Figure 14:
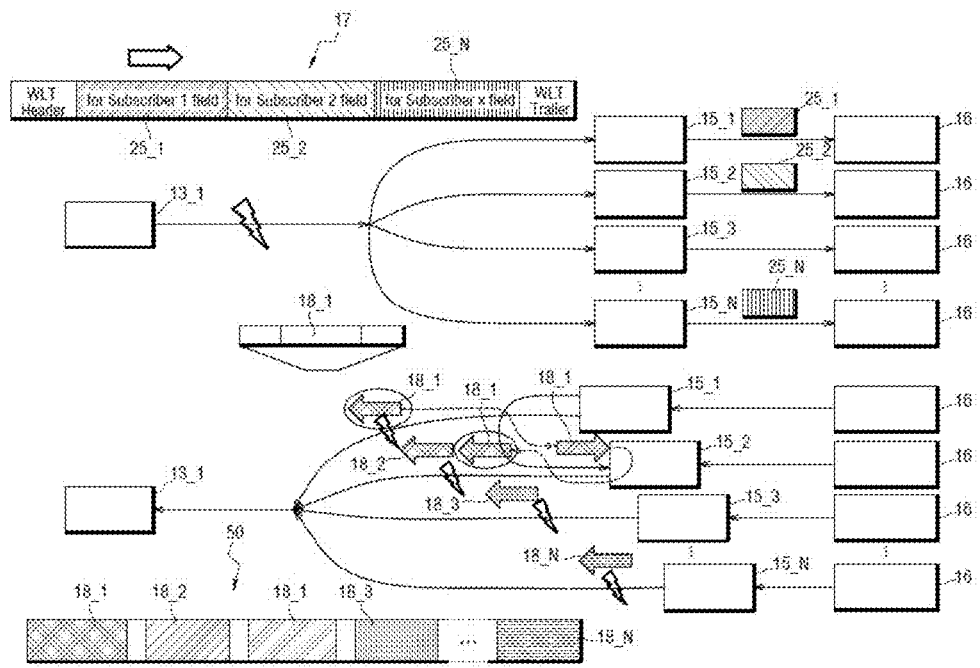
FIG. 14 shows frames being exchanged in a wireless communication system of the invention when a shadow subscriber unit transmits the uplink frame of another subscriber communication unit.

In FIG. 14, the subscriber communication unit 15_2 acts as a shadow subscriber unit for the subscriber communication unit 15_1. The uplink frames transmitted by the subscriber communication unit 15_1 are acquired and stored by the shadow subscriber unit 15_2, and they are systematically re-transmitted by the shadow subscriber unit 15_2.

The uplink frame 18_1 is thus transmitted both by the subscriber communication unit 15_1 and also by the subscriber communication unit 15_2, so that in the event of the uplink frame 18_1 that was transmitted by the subscriber communication unit 15_1 being lost or corrupted, the uplink frame 18_1 is nevertheless correctly received by the central communication unit.

The uplink frames 18 are transmitted in the following order by the subscriber communication units 15 so as to constitute the following frame string 50:

18_1, 18_2, 18_1, 18_3, . . . , 18_N.

Figure 15:
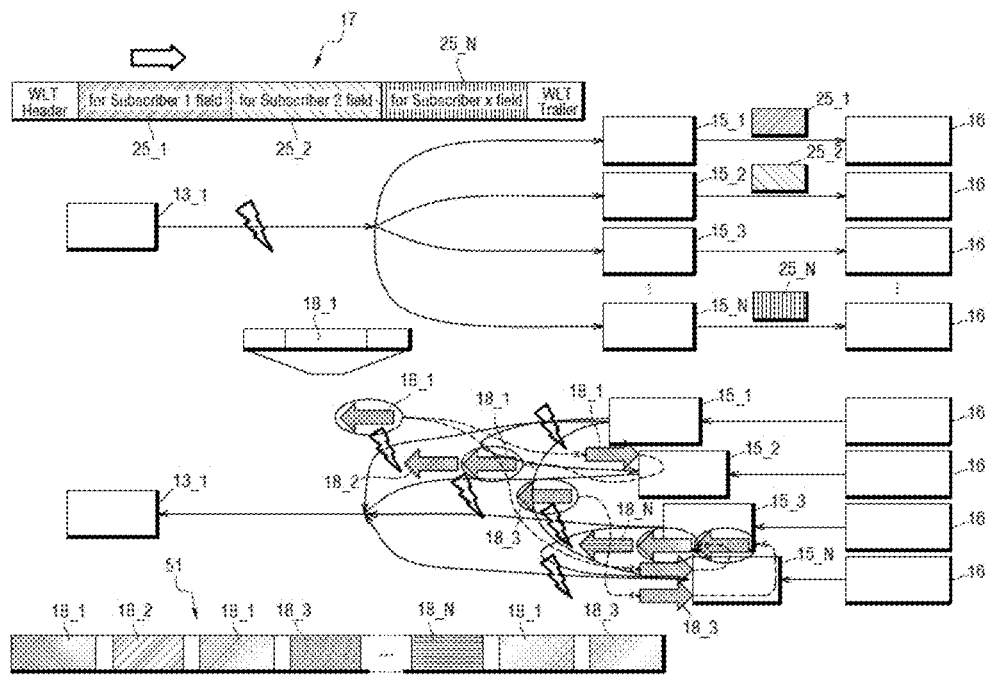
FIG. 15 shows frames being exchanged in a wireless communication system of the invention when two shadow subscriber units transmit the uplink frames of two other subscriber communication units.

In FIG. 15, the subscriber communication unit 15_2 acts as the shadow subscriber unit for the subscriber communication unit 15_1, and the 15_N acts as the shadow subscriber unit both for the subscriber communication unit 15_1 and also for the subscriber communication unit 15_3.

The uplink frames 18_1 transmitted by the subscriber communication unit 15_1 are acquired and stored by the shadow subscriber unit 15_2 and by the shadow subscriber unit 15_N, and they are systematically re-transmitted both by the shadow subscriber unit 15_2 and also by the shadow subscriber unit 15_N. The uplink frames 18_3 transmitted by the subscriber communication unit 15_3 are acquired and stored by the shadow subscriber unit 15_N, and they are systematically re-transmitted by the shadow subscriber unit 15_N.

Thus, in the event of the uplink frame 18_1 transmitted by the subscriber communication unit 15_1 and the uplink frame 18_3 transmitted by the subscriber communication unit 15_3 both being lost, since the uplink frame 18_1 is also transmitted both by the subscriber communication unit 15_2 and by the subscriber communication unit 15_N (and is thus available the central communication unit), and since the uplink frame 18_3 is also transmitted by the subscriber communication unit 15_N (and is thus available for the central communication unit), these uplink frames are nevertheless received correctly.

The uplink frames are transmitted in the following order by the subscriber communication units 15 so as to constitute the following frame string 51:

18_1, 18_2, 18_1, 18_3, 18_4, . . . , 18_N, 18_1, 18_3.

This systematic approach is particularly advantageous. There is no need to test and analyze the quality of the radiofrequency transmission channels between the central communication unit and each of the subscriber communication units, nor is there any need to maintain a pseudo-dynamic state table of those channels: even if the uplink frames transmitted by one of the subscriber communication units are lost, since there is another subscriber communication unit designated to act systematically as a relay, those frames are still received correctly by the central communication unit.

Naturally, the invention is not limited to the embodiment described, but covers any variant coming within the ambit of the invention as defined by the claims.

The invention is not necessarily implemented with data concentrators and sensors: the central equipment and the remote equipment could be constituted by various types of avionics equipment presenting various types of performance. By way of example, the remote equipment could comprise multimedia installations, each associated with a respective passenger seat.

It is possible to make provision for a single piece of central equipment to incorporate a plurality of central communication units.

The successive communication cycles need not necessarily all have the same duration. In the present application, the term "communication cycle" designates a time interval during which the central communication unit sends the global downlink frame and receives all of the uplink frames (i.e. one uplink frame from each subscriber communication unit plus the uplink frames transmitted by the shadow subscriber units).

As described above, the central communication unit transmits the waiting durations to the subscriber communication units, with the waiting durations being included in the data packets of the global downlink frame.

The waiting duration that is associated with each subscriber communication unit could perfectly well be determined locally by the subscriber communication unit itself. For example, the subscriber communication unit could have access to a single table (i.e. a table that is common to all of the subscriber communication units) and could use its identifier to acquire the waiting duration that is associated therewith from the single table. A subscriber communication unit could also determine its waiting duration from a predefined relationship.

The waiting duration could also be previously loaded in the subscriber communication unit.

The invention claimed is:

1. A central communication unit arranged to communicate wirelessly during successive communication cycles with a plurality of subscriber communication units, the central communication unit comprising:
   a memory;
   a processor;
   transmitter means arranged, during each communication cycle, to transmit a single global downlink frame addressed to all of the subscriber communication units, the global downlink frame comprising a plurality of data packets, each addressed to a respective one of the subscriber communication units, the global downlink frame supplying a common reference time to all of the subscriber communication units so that, after receiving the global downlink frame, each subscriber communication unit can start transmitting an uplink frame at the end of a waiting interval starting at the common reference time and having a duration equal to a respective waiting duration that is associated with said subscriber communication unit, the waiting durations all being different and being defined in such a manner as to avoid collisions between the uplink frames; and receiver means arranged, during said communication cycle, to receive in succession the uplink frames transmitted by each of the subscriber communication units.

2. The central communication unit according to claim 1, wherein the common reference time is an end-of-reception moment of the global downlink frame by the subscriber communication units cease receiving.

3. The central communication unit according to claim 1, wherein each data packet of the global downlink frame addressed to a subscriber communication unit includes an acknowledgement that makes it possible to verify whether an uplink frame transmitted by said subscriber communication unit during a preceding communication cycle was, or was not, received correctly.

4. The central communication unit according to claim 1, wherein each data packet of the global downlink frame addressed to a subscriber communication unit includes the waiting duration that is associated with said subscriber communication unit.

5. The central communication unit according to claim 1, wherein the central communication unit is configurable to be a master central unit or else to be a shadow central unit, the central communication unit being arranged, when it is a shadow central unit, to monitor a master central unit without itself transmitting global downlink frames, and to take the place of the master central unit in the event of a failure of the master central unit.

6. The central communication unit according to claim 5, wherein the central communication unit is arranged, when it is a shadow central unit, to acquire the global downlink frames transmitted by the master central unit, and to take the place of the master central unit when the master unit is no longer transmitting global downlink frames.

7. The central communication unit according to claim 5, wherein the central communication unit is arranged to cooperate with one or more other central communication units in such a manner that the central communication units act together in autonomous manner to be configured so as to define one master central unit and one or more shadow central units.

8. The central communication unit according to claim 1, wherein the receiver means include monitor means arranged to interrupt the transmission of download global frames by the transmitter means when the transmission of global downlink frames is faulty.

9. Electronic equipment incorporating a central communication unit according to claim 1.

10. A communication method performed in a central communication unit, and comprising the following successive steps performed during communication cycles:

during each communication cycle, transmitting a single global downlink frame addressed to all of the subscriber communication units, the global downlink frame comprising a plurality of data packets, each addressed to a respective one of the subscriber communication units, the global downlink frame supplying a common reference time to all of the subscriber communication units so that, after receiving the global downlink frame, each subscriber communication unit can start transmitting an uplink frame at the end of a waiting interval starting at the common reference time and having a duration equal to a respective waiting duration that is associated with said subscriber communication unit, the waiting durations all being different and being defined in such a manner as to avoid collisions between the uplink frames; and during said communication cycle, receiving in succession the uplink frames transmitted by each of the subscriber communication units.

11. The communication method according to claim 10, further comprising the steps, during each communication cycle, of starting a time counter and of transmitting the global downlink frame when the current value of the time counter reaches a predetermined reference duration (Tref) of the communication cycle.

12. A non-transitory computer-readable storage medium storing a computer program including instructions that cause a central communication unit to execute a communication method performed in the central communication unit, the communication method comprising the following successive steps performed during communication cycles:

during each communication cycle, transmitting a single global downlink frame addressed to all of the subscriber communication units, the global downlink frame comprising a plurality of data packets, each addressed to a respective one of the subscriber communication units, the global downlink frame supplying a common reference time to all of the subscriber communication units so that, after receiving the global downlink frame, each subscriber communication unit can start transmitting an uplink frame at the end of a waiting interval starting at the common reference time and having a duration equal to a respective waiting duration that is associated with said subscriber communication unit, the waiting durations all being different and being defined in such a manner as to avoid collisions between the uplink frames; and during said communication cycle, receiving in succession the uplink frames transmitted by each of the subscriber communication units.

13. A subscriber communication unit arranged to communicate wirelessly during successive communication cycles with a central communication unit, the subscriber communication unit comprising:

a memory;

a processor;

receiver means arranged, during each communication cycle, to receive a global downlink frame transmitted by the central communication unit, to identify and acquire a data packet that is addressed thereto in the global downlink frame, and to determine a common reference time from the global downlink frame; and transmitter means arranged, at the end of a waiting interval starting at the common reference time and having a waiting duration that is associated with said subscriber communication unit, to transmit an uplink frame to the central communication unit.

14. The subscriber communication unit according to claim 13, wherein the common reference time is the end-of-reception moment at which the subscriber communication unit ceases receiving the global downlink frame.

15. The subscriber communication unit according to claim 13, wherein the waiting duration that is associated with the subscriber communication unit is incorporated in the data packet that is addressed thereto in the global downlink frame.

16. The subscriber communication unit according to claim 13, wherein the waiting duration that is associated with the subscriber communication unit is determined locally by the subscriber communication unit itself, or else is previously loaded in the subscriber communication unit.

17. The subscriber communication unit according to claim 13, wherein the subscriber communication unit is configurable to be a shadow subscriber unit, the subscriber communication unit being arranged, when it is a shadow subscriber unit, to act systematically during each communication cycle to acquire another uplink frame transmitted by another subscriber communication unit, and also to transmit that other uplink frame to the central communication unit.

18. The subscriber communication unit according to claim 17, wherein the subscriber communication unit is arranged to transmit that other uplink frame following its own uplink frame by concatenating the frames.

19. Electronic equipment incorporating a central communication unit according to claim 13.

20. A communication method performed in a subscriber communication unit according arranged to communicate wirelessly with a central communication unit, the method comprising the following steps implemented during successive communication cycles:
during each communication cycle, receiving a global downlink frame transmitted by the central communication unit, identifying and acquiring a data packet that is addressed thereto in the global downlink frame, and determining a common reference time from the global downlink frame; and
during said communication cycle, at the end of a waiting interval starting at the common reference time and having a waiting duration that is associated with said subscriber communication unit, transmitting an uplink frame to the central communication unit.

21. The communication method according to claim 20, further comprising the following steps after receiving a global downlink frame:
starting a first time counter and a second time counter at the common reference time;
starting transmission of the uplink frame when the current value of the second time counter reaches the waiting duration;
if the current value of the first time counter reaches the predetermined reference duration before a following global downlink frame is received correctly, re-starting the first time counter and the second time counter;
if the current value of the second counter reaches a duration equal to the waiting duration without a following global downlink frame being received, incrementing by one unit a third counter for counting global downlink frames that have been lost; and
verifying that the current value of the third counter is less than a predetermined number, and if so, transmitting an uplink frame.

22. A non-transitory computer-readable storage medium storing a computer program including instructions that cause a subscriber communication unit to execute a communication method performed in the subscriber communication unit and arranged to communicate wirelessly with a central communication unit, the method comprising the following steps implemented during successive communication cycles: during each communication cycle, receiving a global downlink frame transmitted by the I central communication unit, using anthe identifier that is specific to a subscriber communication to identify and acquire a data packet that is addressed thereto in the global downlink frame, and determining a common reference time from the global downlink frame; and during said communication cycle, at the end of a waiting interval starting at the common reference time and having a waiting duration that is associated with said subscriber communication unit, transmitting an uplink frame to the central communication unit.

23. A wireless communication system comprising:
a device arranged to communicate wirelessly during successive communication cycles with a plurality of subscriber communication units, the device comprising:
a memory;
a processor;
transmitter means arranged, during each communication cycle, to transmit a single global downlink frame addressed to all of the subscriber communication units, the global downlink frame comprising a plurality of data packets, each addressed to a respective one of the subscriber communication units, the global downlink frame supplying a common reference time to all of the subscriber communication units so that, after receiving the global downlink frame, each subscriber communication unit can start transmitting an uplink frame at the end of a waiting interval starting at the common reference time and having a duration equal to a respective waiting duration that is associated with said subscriber communication unit, the waiting durations all being different and being defined in such a manner as to avoid collisions between the uplink frames; and
receiver means arranged, during said communication cycle, to receive in succession the uplink frames transmitted by each of the subscriber communication units; and
a plurality of subscriber communication units arranged to communicate wirelessly during successive communication cycles with a central communication unit, the subscriber communication unit comprising:
receiver means arranged, during each communication cycle, to receive a global downlink frame transmitted by the central communication unit, to identify and acquire a data packet that is addressed thereto in the global downlink frame, and to determine a common reference time from the global downlink frame; and
transmitter means arranged, at the end of a waiting interval starting at the common reference time and having a waiting duration that is associated with said subscriber communication unit, to transmit an uplink frame to the central communication unit.

24. The wireless communication system according to claim 23, wherein the device includes three units,
wherein the three units are configured to comprise a master central unit, a first shadow central unit, and a second shadow central unit,
wherein the shadow central unit is arranged to monitor the master central unit without itself transmitting global downlink frames, and to take the place of the master central unit in event of a failure of the master central unit.

25. An aircraft including a wireless communication system according to claim 23.

* * * * *